March 27, 1962 W. H. NICHOLS 3,027,134
NOISELESS VALVE
Filed Jan. 31, 1958
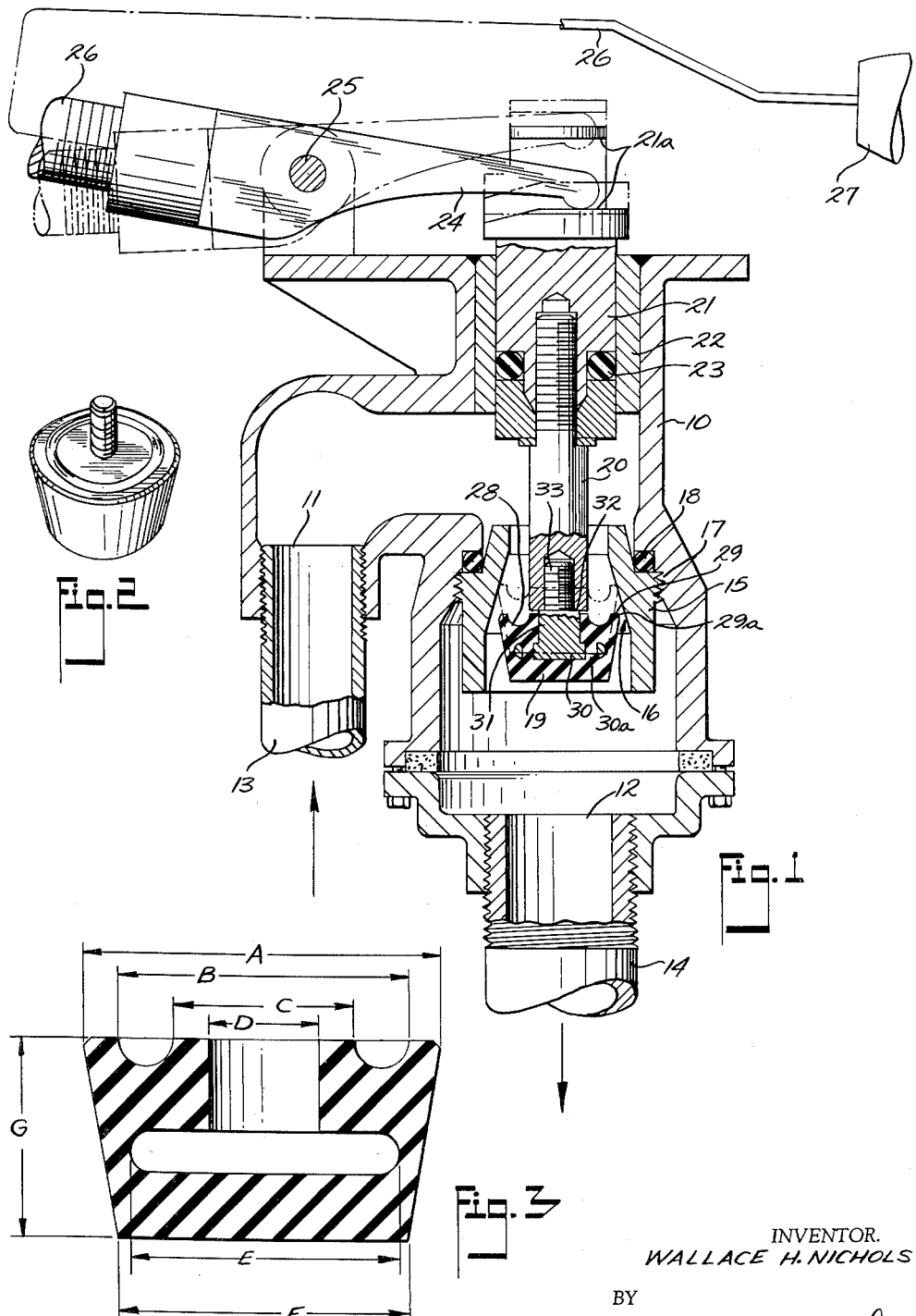
INVENTOR.
WALLACE H. NICHOLS
BY
Hyde, Meyer, Baldwin & Doran
ATTORNEYS

United States Patent Office 3,027,134
Patented Mar. 27, 1962

3,027,134
NOISELESS VALVE
Wallace H. Nichols, Cleveland, Ohio, assignor to Rand Development Corporation, Cleveland, Ohio, a corporation of Ohio
Filed Jan. 31, 1958, Ser. No. 712,549
2 Claims. (Cl. 251—175)

This invention relates to improvements in a substantially noiseless valve and one which is particularly adaptable for use in a ball cock in the tank of a flush toilet although it will be recognized that my invention has many other uses.

One of the objects of the present invention is to provide a valve which requires very little force to close it but which will close tight under light pressure and will stand a tremendous number of opening and closing operations without significant wear of the valve.

Other objects and advantages of my invention will be apparent from the accompanying drawings and description and the essential features thereof will be set forth in the appended claims.

In the drawings—

FIG. 1 is a central sectional view through a ball cock embodying my invention with a controlling float being shown somewhat diagrammatically.

FIG. 2 is a perspective view of the valve plug itself removed from the valve stem; while FIG. 3 is a central sectional view through the valve plug and its reinforcing means, in sufficient detail to illustrate various dimensions of the plug.

I have chosen to describe my invention in connection with a ball cock for use in a flush toilet reservoir tank. Fixed in the tank by means not shown is a housing 10 which has a fluid inlet 11 and fluid outlet 12. In the usual fashion, a water inlet line 13 is connected at 11 and the line for filling the reservoir for flushing the toilet is connected at 14. A fitting 15 providing the valve bore 16 is threaded into the housing at 17 and preferably sealed against liquid leakage by the O-ring 18. A valve plug 19 is secured to the lower end of the valve stem 20 which in turn is secured to a piston-like guide 21 which is smoothly reciprocable in a sleeve 22 fixed in the upper portion of the housing 10. Preferably a sealing O-ring 23 is provided to prevent leakage past the guide 21. The upper end of the guide is provided with a through opening 21a into which enters an actuator 24 which moves about a pivot 25 fixed to the housing 10. The actuator 24 is secured on the end of a generally U-shape arm 26 which is bent back upon itself as shown by the dot-dash line in FIG. 1 so as to pass over toward the right-hand side of the housing 10 where the arm 26 is attached to a float 27 which rides on the water in the tank reservoir. When the level in the tank is in its predetermined full position the actuator 24 is in the dot-dash line of FIG. 1 and the valve plug 19 is in its upper or closed position as indicated in the dot-dot-dash lines. When the toilet is flushed, the ball float 27 moves downwardly and is effective to move the actuator 24 to the full line position of FIG. 1 which opens the valve as there shown in full lines.

The present invention relates to the improvement in the plug valve 19 and the coacting bore 16. It will be noted that the bore is frusto-conical in shape communicating at its upper end with the inlet 11 and at its lower end with the outlet 12. This bore diverges radially outwardly away from the inlet end thereof. The sealing plug 19 is of a firmly resilient material, preferably rubber or rubber-like material having a durometer between 65 and 85, 75 to 85 durometer hardness of rubber being preferred. The upstream base of the plug 19 is of a circular contour and of a diameter equal to that of an intermediate zone of the bore so that the plug in the valve closed position engages the side walls of the bore so as to completely seal off the inlet from the outlet.

In a preferred form of my invention, the plug 19 is frusto-conical in shape as shown in the drawings having its larger base upstream and its smaller base downstream and having the sides thereof inclined at a flat angle to the axis thereof preferably an angle between 4 and 8 degrees, the form here shown having an angle of 5 degrees 30 minutes with the axis. The upstream base of the plug 19 has an annular groove 28 recessed into it and concentric about the axis of the plug. This leaves an annular lip 29 extending upstream and slightly radially outwardly from the periphery of the upstream base of the plug to engage with the frusto-conical bore 16 in a sealing action. Preferably, the upper and outermost corner of the lip 29 is broken away as shown in the various views to provide a narrow flattened annular peripheral sealing surface 29a which is at an angle to the vertical and preferably not over $\frac{1}{32}$ to $\frac{1}{16}$ inch wide measured along the slant height of the broken away surface 29a.

Substantially rigid reinforcing means 30 is provided extending across the plug 19 at a substantially midway zone between the upper and lower bases of the plug. This reinforcing means is here shown as a metal disc wholly embedded in the material of the plug and preferably having through openings 30a through which the rubber-like material flows as the plug is molded so that the reinforcing means and the plug are bonded together. The reinforcing means 30 is provided with a neck 31 which terminates in a shoulder 32 of larger diameter and a male threaded end 33 of smaller diameter which is threaded into the lower end of the stem 20. Preferably, the material of the plug 19 lies very close to the lower end of the stem 20 with the inner wall of the recess 28 substantially flush with the outer surface of the stem 20 and in alignment therewith. However, the shoulder 32 takes all the load off the rubber-like material of the plug 19 when the parts are assembled as shown in FIG. 1 so that the rubber-like plug is not distorted.

In connection with FIG. 3 I desire to give some illustrative dimensions from what I call the half-inch size of my valve so that one will understand one specific form of my invention. In this particular embodiment, the dimension A is .515 inch. The dimension B is .419 inch leaving a lip 29 which is approximately $\frac{3}{64}$ inch thick at the top. The annular groove 28 is substantially semicircular in section struck on a $\frac{1}{32}$ inch radius leaving a dimension C across the inside diameter of the recess 28 of .294 inch. The neck 31 at dimension D is .1875 inch. The dimension E across the outside diameter of the reinforcing means 30 is .375 inch. It is essential to the proper operation of my invention that this diameter be less than the full diameter of the plug 19 at that zone but should be at least equal to the diameter across the bottom of the annular recess 28. In this form of my invention the dimension across the bottom of the annular recess is approximately .3565 inch. The dimension F at the smaller base of the plug is .467 inch and the thickness G of the plug is .250 inch.

The operation of my invention should now be clear from the description thus far given. When a flushing operation of the toilet is ended, the float 27 is in its lowermost position and the valve plug 19 is in its open or full line position of FIG. 1. Water then enters through pipe 13 and inlet 11, passes through the valve, past the outlet 12 and through pipe 14 to refill the tank. As the tank fills up, the float 27 rises until finally the actuator 24 moves from the full line position to the dot-dot-dash line position of FIG. 1. This causes the lip 29 to move upwardly until the sealing surface 29a engages the inclined frusto-conical surface 16 of the bore. At this time a combination of actions take place which provides a very efficient seal. In the first place, all of the mechanical force tending to pull the plug 19 into its sealing position is exerted through stem 20 and its axial connection to the reinforcing means 30. This then pulls upon the rubber-like material of the valve plug and this force is exerted at least at the base of the recess 28 or preferably slightly radially outside thereof as shown in the drawing. This gives a component of force exerted upwardly and outwardly in line with the sealing lip 29. At the same time, the water entering through line 13 under pressure exerts a force in the annular recess 28 tending to expand the lip 29 radially outwardly. This combination of forces presses the sealing surface 29a firmly against the frusto-conical bore but only when the lip 29 is firmly resilient as hereinabove described.

What is claimed is:

1. A valve comprising a housing having a fluid inlet and a fluid outlet, there being a frusto-conical bore in said housing between said inlet and outlet and communicating with both of them, said bore diverging radially outwardly away from the inlet end thereof, a firmly resilient frusto-conical sealing plug of rubber-like material having an upstream base of larger diameter and of a circular contour of a diameter equal to that of an intermediate zone of said bore, said plug having a downstream smaller base generally parallel to said upstream base and spaced therefrom, there being an annular groove substantially semi-circular in cross section recessed into said upstream base and opening upwardly and concentric thereof leaving an annular lip forming the radially outer wall of said groove and extending upstream and slightly radially outwardly from the periphery of said upstream base and engaging said bore of said intermediate zone only to provide a seal there, substantially rigid reinforcing means extending across said plug at a substantially midway zone between the bases thereof, said reinforcing means wholly embedded in the material of said plug and being located axially spaced away from said lip and recess, said reinforcing means having an outside diameter less than the diameter of said plug at said zone and at least equal to the diameter across the bottom of said annular groove, and stem means for moving said plug into and out of engagement with said bore, all parts of said annular lip moving generally parallel to the axis of said stem between open and closed positions of said plug without substantial deformation of said lip, said stem means connected centrally of said reinforcing means and providing the sole force acting on said plug to move it upstream in said bore, said resilient sealing plug being of rubber-like material having a hardness between 65 and 85 durometer, said annular lip being approximately $3/64$ inch thick at its upper edge, the outer peripheral edge of said sealing lip having a flattened sealing surface of uniform character extending radially outwardly and axially downstream, said sealing surface having a slant height between $1/32$ and $1/16$ inch tapered conically in the same direction as said frusto-conical bore, whereby the stem means exerts an axial force pulling the plug lip upstream and outwardly into sealing position and the fluid entering said inlet expands the lip radially outwardly against the frusto-conical bore so that very little force is required to close the valve and the valve will have a long wear life.

2. A valve, as set forth in claim 1, with said stem means extending away from said reinforcing means concentrically through said annular groove to a zone receiving the sole actuating force for said plug.

References Cited in the file of this patent

UNITED STATES PATENTS

| | | |
|---|---|---|
| 820,154 | Towne | May 8, 1906 |
| 963,060 | Noppel | July 5, 1910 |
| 2,659,566 | Rand | Nov. 17, 1953 |
| 2,770,443 | Rand | Nov. 13, 1956 |
| 2,784,732 | Nurkiewicz | Mar. 12, 1957 |
| 2,816,729 | Jensen | Dec. 17, 1957 |
| 2,821,356 | Rand | Jan. 28, 1958 |